(12) United States Patent
Veil

(10) Patent No.: US 6,812,596 B2
(45) Date of Patent: Nov. 2, 2004

(54) SAFETY SWITCHING DEVICE MODULE ARRANGEMENT

(75) Inventor: Richard Veil, Stuttgart (DE)

(73) Assignee: Pilz GmbH & Co., Ostfildern (DE)

(*) Notice: Subject to any disclaimer, the term of this patent is extended or adjusted under 35 U.S.C. 154(b) by 0 days.

(21) Appl. No.: 10/273,155

(22) Filed: Oct. 17, 2002

(65) Prior Publication Data

US 2003/0058602 A1 Mar. 27, 2003

Related U.S. Application Data

(63) Continuation of application No. PCT/EP01/02771, filed on Mar. 13, 2001.

(30) Foreign Application Priority Data

Apr. 22, 2000 (DE) .......................................... 100 20 075

(51) Int. Cl.[7] .............................................. G06F 13/10
(52) U.S. Cl. .............................. 307/326; 361/733; 710/3
(58) Field of Search ................................ 361/728, 729, 361/730, 731; 307/326

(56) References Cited

U.S. PATENT DOCUMENTS

| | | | | |
|---|---|---|---|---|
| 4,853,831 A | * | 8/1989 | Tsuchiya | 361/686 |
| 4,862,451 A | * | 8/1989 | Closs et al. | 370/353 |
| 4,882,702 A | * | 11/1989 | Struger et al. | 710/2 |
| 5,038,317 A | * | 8/1991 | Callan et al. | 710/301 |
| 5,068,778 A | * | 11/1991 | Kosem et al. | 700/9 |
| 5,218,679 A | | 6/1993 | Hasegawa et al. | |
| 5,519,636 A | | 5/1996 | Stoll et al. | |
| 5,845,149 A | * | 12/1998 | Husted et al. | 710/9 |
| 6,157,725 A | * | 12/2000 | Becker | 381/86 |
| 6,301,509 B1 | * | 10/2001 | Obata | 710/316 |
| 6,393,329 B1 | | 5/2002 | Mishina | |
| 6,418,027 B1 | * | 7/2002 | Suzuki et al. | 361/729 |
| 6,721,810 B2 | * | 4/2004 | Massie | 710/3 |

FOREIGN PATENT DOCUMENTS

| | | | |
|---|---|---|---|
| DE | 40 33 969 A1 | 4/1992 | |
| DE | 43 12 757 A1 | 10/1994 | |
| DE | 195 02 499 A1 | 8/1996 | |
| DE | 195 22 202 C1 | 1/1997 | |
| DE | 197 07 241 A1 | 9/1998 | |
| DE | 198 38 178 A1 | 3/1999 | |
| DE | 199 10 322 A1 | 9/1999 | |
| EP | 0352683 A2 * | 1/1990 | G06F/13/10 |
| GB | 2 336 451 A | 10/1999 | |
| JP | 01-177610 * | 7/1989 | G05B/19/04 |
| JP | 02-090301 * | 3/1990 | G05B/19/05 |

OTHER PUBLICATIONS

Gräf, W.: Maschinensicherheit, Hüthig Verlag 1997 ISBN 3–7785–2633–2 (discussed on p. 1/2 of the specification.

* cited by examiner

Primary Examiner—Brian Sircus
Assistant Examiner—Roberto J. Rios
(74) Attorney, Agent, or Firm—Harness, Dickey & Pierce P.L.C.

(57) ABSTRACT

The invention relates to a module arrangement of safety switching devices. The arrangement comprises a plurality of input modules each for processing input signals from a safety transmitter and each for generating output signals. It further comprises at least two output modules each for driving an actuator responsive to the output signals. The input modules and the output modules are arranged in a series forming a series of modules. The input modules each are associated to one output module. According to one aspect of the invention, the association of the input modules to the first, the second or both output modules is achieved on the basis of the position of the input module within the series of modules.

17 Claims, 4 Drawing Sheets

SAFETY SWITCHING DEVICE MODULE ARRANGEMENT

CROSS-REFERENCES TO RELATED APPLICATIONS

This application is a continuation of copending international patent application PCT/EP01/02771 filed on Mar. 13, 2001 designating the U.S., which claims priority from German patent application DE 100 20 075.3, filed on Apr. 22, 2000.

BACKGROUND OF THE INVENTION

The present invention relates to a safety switching device module arrangement comprising at least one input module for processing signals from a safety transmitter and for generating output signals, and comprising at least two output modules for driving an actuator, wherein the input module and the output modules are arranged in a series forming a series of modules, and wherein the input module is associated to at least one output module.

Safety switching devices are generally known. They are used to fail-safely analyze the signals from a safety transmitter, as for example an emergency off switch, a protective door position switch etc., and to drive one or more fail-safe output contacts of an output circuit. Actuators, such as contactors, valves, motors, and hazardous machine parts such as saw blades, robot arms, high-voltage equipment, etc., are transferred into a safe state by these output contacts then. The present assignee offers a large number of different types of safety switching devices under the common tradename "PNOZ". Furthermore, in "Maschinensicherheit" [Machine safety], Winfried Gräf, Hüthig Verlag, 1997, several variations of safety switching devices are illustrated. A specific safety switching device is also disclosed by DE 197 36 183 C1.

In practice, it very often occurs that a plurality of switching events, for example the actuation of an emergency off switch, the opening of a door or reaching through a light curtain, have to be AND-linked, for example. For this purpose, a plurality of switching devices are connected in series, the output terminals of one safety switching device being connected to the input terminals of the following safety switching device.

In many cases, in addition to the AND linking, a hierarchical structure of the safety switching devices is desired, in order, for example in one case, to stop the entire machine with a single switching event, such as an emergency off switch, and in order to stop only a specific motor of the complete machine with other switching events, such as protective door switches. Such a hierarchical structure has hitherto been possible by appropriate wiring and it has been proved successful in practice.

Nevertheless, there remains a desire to provide a simpler and less expensive structure without any deterioration in safety.

SUMMARY OF THE INVENTION in view of the above, it is an object of the present invention to provide a safety switching device module arrangement which allows for a flexible linking of the safety switching devices used without having to perform external wiring of the individual safety switching devices.

This object is achieved according to one aspect of the invention by a safety switching device module arrangement as mentioned at the outset, wherein the association of the input module to the first, the second or both output modules is achieved on the basis of the position of the input module within the series of modules.

With the inventive safety switching device module arrangement, it is possible to select the association of the input module to one or both output modules by the input module being placed at a specific position within the series of modules. Within this context, the term "association" is to be understood to mean that there is a signal connection of direct or indirect type between the input module and the "associated" output module, so that the output module controls the connected actuator in response to the output signal from the associated input module.

The user of the safety switching device module arrangement is therefore in the position to modularly build up a system in accordance with his needs, and he can freely select the association of the input modules to the output modules and therefore the linking of the signals from the safety transmitters. The input module can act on the first output module, on the second output module or on both output modules depending on its position within the series of modules. An (associated) input module acting on both output modules serves for the central actuation of both output modules, while the association of an input module to an individual output module actuates only the latter.

Consequently, the inventive safety switching device module arrangement makes it possible for the user to have a very flexible and simple structure of a safety switching device system, in which the safety switching devices can be linked differently to one another, the linking itself being defined by the corresponding selection of the position of the input module within the series of modules, without having to make any changes in the wiring.

In a refinement of the invention, at least three input module places are provided each to accommodate an input module, and at least a first and a second output module place are provided each to accommodate an output module, at least one input module place being associated to the first output module place, at least a further input module place being associated to the second output module place, and at least another input module place being associated to both the first and to the second output module place.

In a configuration, fixed input module places are provided, for example in a housing, which are connected to output module places, for example by a fixed wiring. By using an association table, the user can assign input modules to specific output modules in accordance with his needs by selecting the appropriate input module places. Owing to the fixed association of input module places to output module places, a simple structure can be implemented, which manages without control modules, etc.

In another refinement of the invention, each input module place has an output terminal and each output module place has an input terminal, a wiring, preferably an electrical connection, being provided between the respective output terminal of the input module place and the input terminal of the output module place in accordance with the association of input module places to output module places.

These measures have the advantage that a fail-safe, software-independent, and permanently wired solution is provided, in which the association of individual module places for input modules to module places for output modules is predefined permanently, therefore being simple to handle and cost-effective. Although there is permanent wiring, a very flexible system of safety switching devices is built up, but the possibilities of associations are restricted by the fixed wiring. However, in many cases, such a solution is sufficient for the requirements placed.

In another refinement of the invention, a control module is provided, which controls the association of input modules and output modules.

This measure has the advantage that the predefined limits on flexibility in the permanently wired solution are overcome. Rather, the control module allows any desired association of input modules to output modules. The control module preferably comprises a control device having a memory unit, in which an association table defining the association is stored. The control device is preferably implemented as a microprocessor or microcontroller, and a data bus—preferably a serial data bus, for example a serial optical data bus—provides the connection between the control device and the module places.

The latter measures particularly provide the advantage that the module arrangement can be scaled very easily by adding further modules. The new modules merely have to be attached to the existing data bus.

Another increase in the flexibility of the overall system is achieved when the control device comprises a detection unit which detects a positioning of the modules within the series of modules, wherein an absolute association table is determined on the basis of the placing of the output modules and on the basis of a relative association table. This means that the association table initially contains an association of module places within the series of modules relative to the output modules. For example, the relative association table could contain the association that all modules on the left beside an output module are associated to the latter, and all the modules on the right of the final right output module are associated to all the output modules. By using the occupancy of the module places within the series of modules by input and output modules, the control device can then determine, on the basis of the relative association table, an absolute association table, in which the association is stored in absolute values, that is to say, for example, module 1 acts on module 4, etc.

These measures lead to an even more increased flexibility and freedom in the construction of a modular safety switching device system, which, additionally, can also be scaled very easily. An input unit is preferably provided, which permits the association table to be edited, so that yet another increase in the flexibility of the overall system is achieved.

The input modules are preferably input circuits of the kind known from safety switching devices, i.e. those switching circuits which evaluate the signals from safety transmitters in a fail-safe manner. The output circuits preferably comprise the output contacts of safety switching devices, i.e. switches which operate electromechanically or electronically and which are actuated by the output signals from the input circuits. In this case, the output circuits are also constructed in a fail-safe manner. In this connection, it will be appreciated that a fail-safe construction can be achieved, for example, by providing two independent channels or one channel plus a checking unit.

Further advantages and refinements of the invention emerge from the description and the appended drawing.

It goes without saying that the features mentioned above and those following and still to be explained can be used not only in the respectively specified combination but also in other combinations or on their own without departing from the scope of the present invention.

BRIEF DESCRIPTION OF THE DRAWINGS

Exemplary embodiments of the invention are illustrated in the drawing and will be explained in more detail in the following description. In the drawing.

DETAILED DESCRIPTION OF PREFERRED EMBODIMENTS

Figure 1:
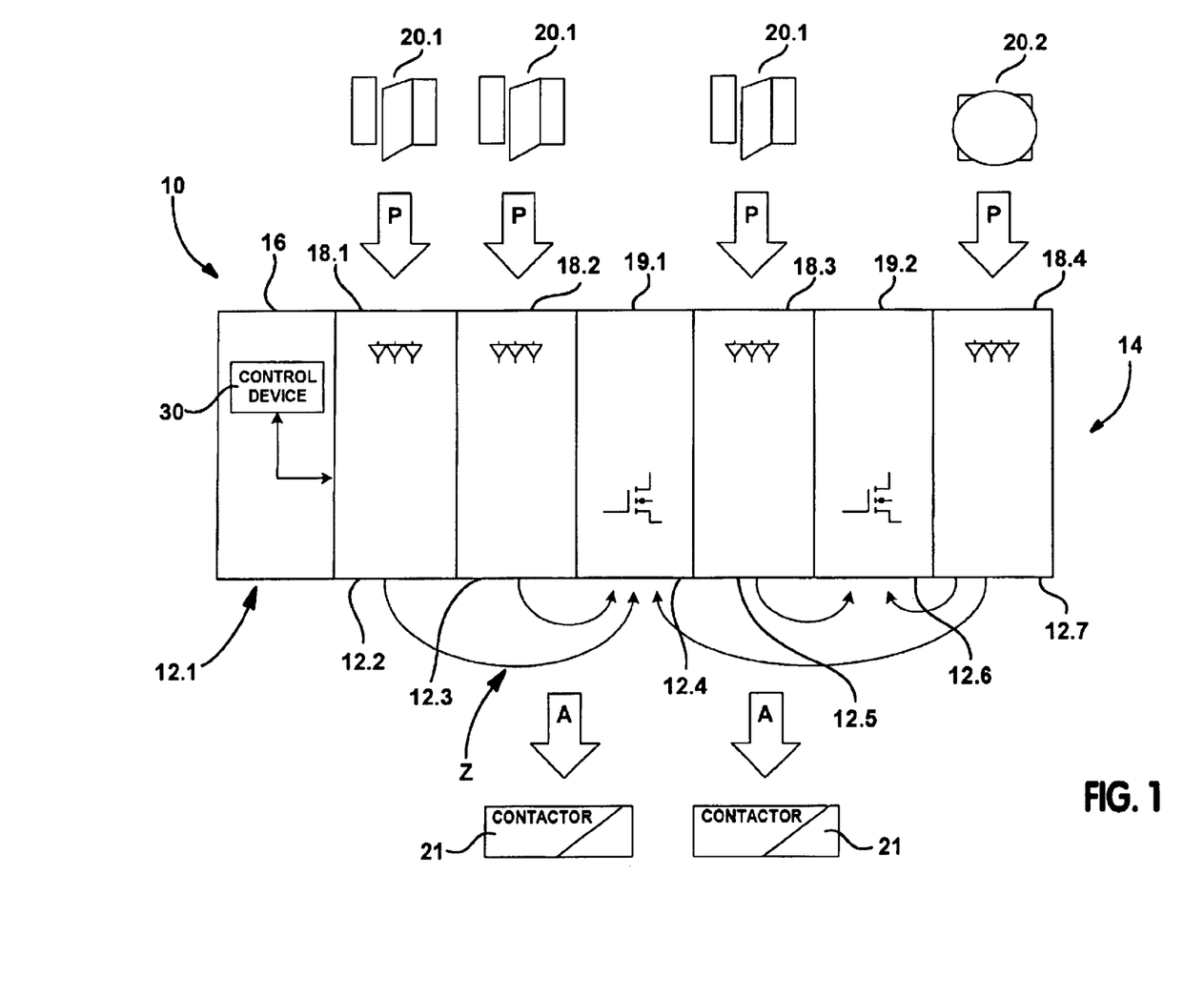
FIG. 1 shows a schematic block representation of a safety switching device module arrangement according to the invention.

In FIG. 1, a safety switching device module arrangement is designated by the reference numeral 10. This safety switching device module arrangement (called the module arrangement in brief below) comprises a large number of module places 12.1 to 12.7 arranged in a series which, in the present exemplary embodiment, each accommodate a module 14. In particular, module place 12.1 contains a control module 16, the module places 12.2, 12.3, 12.5 and 12.7 in each case contain an input module 18.1 to 18.4, and the two module places 12.4 and 12.6 each contain an output module 19.1 and 19.2. The input and output modules thus form a series of modules in which each module assumes a specific position or occupies a specific module place.

On the input side, the input modules 18.1, 18.2, 18.3 and 18.4 are connected to signal transmitters, which is indicated by arrows P. The signal transmitters, which are identified by reference numeral 20 in FIG. 1, are, for example, protective door switches 20.1 or an emergency off switch 20.2. In the present exemplary embodiment, the emergency off switch 20.2 is associated to the input module 18.4, and the other protective door switches 20.1 are associated to the input modules 18.1, 18.2 and 18.3.

The input modules 18 include evaluation and control units, via which the signals from the safety transmitters are evaluated in a fail-safe manner. The basic construction of such input modules is known, for example, from "Maschinensicherheit" [Machine safety], Winfried Gräf, Hüthig Verlag, 1997. In addition, application DE 100 11 211 of the present assignee also shows the structure of such input modules. These input modules are usually constructed with two channels, in order to achieve the required fail-safety in the evaluation of the input signals.

The two output modules 19.1 and 19.2 provided usually comprise electromechanical or electronic switching elements, which safely switch to and from between two switching states on the basis of input signals that are supplied. The output signal from the respective output module 19.1, 19.2 is supplied to an actuator, which is indicated by arrows A. The actuators are, for example, contactors 21, which can provide or interrupt the power supply to a motor, for example.

Figure 2:
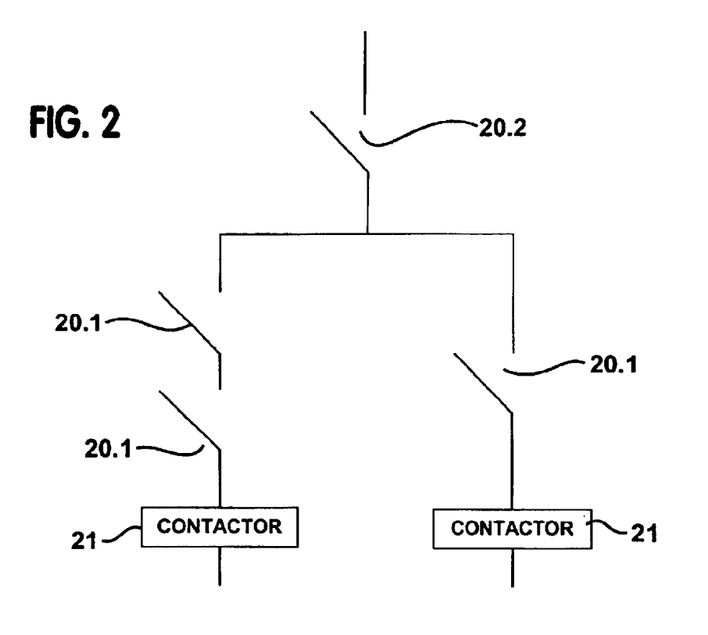
FIG. 2 shows a circuit diagram of a possible association of input modules and output modules.

The function of the overall safety switching device module arrangement is to interrupt the power supply to the motors associated with the two contactors if the emergency off switch 20.2 is pressed, while only one of the two motors is disconnected from the power supply if one of the protective door switches 20.1 is actuated. The corresponding switching diagram is illustrated in FIG. 2. The two contactors 21 are accordingly each supplied via a current path in which in each case the emergency off switch 20.2 and either two protective door switches 20.1 or one protective door switch 20.1 are connected in series.

This results in a hierarchical structure of switches, since the emergency off switch 20.2 acts on both contactors 21, while each of the protective door switches 20.1 acts on only one contactor 21.

With regard to the module arrangement shown in FIG. 1, it is desired for the output signals from the input modules 18.1, 18.2 and 18.4 to act on the output module 19.1, and for the output signals from the input modules 18.3 and 18.4 to act on the output module 19.2, in order to achieve the combination specified in FIG. 2. The aforementioned association of the input modules to the output modules is represented graphically by means of arrows Z. This association, indicated by arrows Z, requires electrical signal lines which connect output terminals of the input modules to input terminals of the output modules. Possible implementations of such electrical connections will be explained in more detail in the further course of the description.

The control module 16 comprises a control device 30, in which the desired association of module places 12 for input modules to module places 12 for output modules is recorded. An association table which defines the association identified by arrows Z could, for example, appear as follows:

|        | Input |      |      |      |
|--------|-------|------|------|------|
| Output | 12.2  | 12.3 | 12.5 | 12.7 |
| 12.4   | V     | V    | —    | V    |
| 12.6   |       |      | V    | V    |

In this table, "V" denotes a signal connection, that is to say, for example, between module place 12.2 and module place 12.4 provided for an output module there is a connection for the transmission of signals. In accordance with the association table specified, therefore, a safety switching device system can be built up in which, independently of each other, two actuators can be driven via the output modules 12.4 and 12.6, the output module in module place 12.4 being actuated via a maximum of three AND-linked signal transmitters, and the output module in module place 12.6 being actuated via a maximum of two AND-linked safety transmitters.

It is also conceivable not to fill individual module places for input modules, so that in the simplest case only the module place 12.7 is fit with an input module 18.4, with the result that both contactors 21 can be actuated solely by the emergency off switch 20.2.

A special feature of the present module arrangement 10 can be seen in the fact that the association of module places 12.2, 12.3, 12.5 and 12.7 for input modules 18.1 to 18.4 to module places 12.4 and 12.6 for output modules 19.1, 19.2 is provided independently of the input modules 18 actually used. The user can therefore assemble a system in a modular manner, only the predefined association table restricting the number of different linking possibilities. If, for example, the user wishes to actuate a contactor 21 via two safety transmitters connected in series, he will select the module places 12.2 and 12.3 for the input modules and the output module 19.1 in the module place 12.4 for driving the corresponding contactor 21. However, if the user wishes to build up a hierarchical system in which two contactors 21 can be actuated via a central emergency off switch 20.2 and in each case via a door switch 20.1, he will select the module places 12.3 and 12.5 for an input module in each case, and the module place 12.7 for an input module 18.4 associated to the emergency off switch, the output modules 19.1, 19.2 being provided in the module places 12.4 and 12.6.

It can be seen therefore that very flexibly different safety switching device systems can be built up, various series circuits and parallel circuits of safety transmitters being conceivable. Of course, the module arrangement 10 shown in FIG. 1 can be scaled, that is to say can also be expanded to more than the four input modules and two output modules shown.

In the aforementioned exemplary embodiment, the module places for the output modules 19.1 and 19.2 were fixed to the module places 12.4 and 12.6. However, it might also be envisiged to build up the module arrangement in a way such that the module places for the output modules 19.1 and 19.2 can likewise be selected freely. In this case, however, the aforementioned absolute association table has to be given up and, instead, a relative association table has to be stored in the control device 30. "Relative" is to be understood to mean that the association of the module places is specified relative to the position of the output modules used in the series of modules. Conversion of the aforementioned absolute table into a relative association table would be expressed in words, for example as follows:

a) All module places to the left of the first output module 19.1 are associated to the latter b) All module places between the first and the second output module 19.1, 19.2 are associated to the second output module 19.2 c) All module places to the right of the second output module 19.2 are associated to both output modules 19.1, 19.2.

In mathematical form, this association could appear as follows:

a) MP<MP−A1→A1 b) MP−A1<MP<MP−A2→A2 c) MP>MP−A2→A1 and A2

MP representing the module place number and MP−A1 representing the module place number of the output module A1, and MP−A2 representing the module place number of the output module A2.

From this relative association table, an absolute association table, as illustrated above, can be calculated as soon as the two output modules 19.1 and 19.2 are fit to appropriate module places. At the start of the system, the control device 30 determines those module places in which output modules are arranged and then calculates the absolute association table by using these. In order to permit the detection of output modules and input modules for the control devices 30, each module 18, 19 has a code, using which the control device can determine the type of module. Furthermore, the control device determines the number of the module place within the series of modules in which the respective input or output module is accommodated. Thus, in the control device there is an exact depiction of all the module places and therefore of the entire series of modules with the inserted input and output modules. This information, together with the calculated absolute association table, makes it possible for the control module 16 to pass on the output signals from the input modules 18.1 to 18.4 to the associated output module in accordance with the linking rules specified in the association table.

It turns out that this system, in which fixed module places for output modules are dispensed with, is very much more flexible. For example, it would be conceivable to provide the two output modules 19.1 and 19.2 in the module places 12.3 and 12.5, and the input modules 18.2 and 18.3 in the module places 12.4 and 12.6. In the aforementioned relative association table, this would then result in the emergency off switch 20.2 being AND-linked with a protective door switch 20.1, and both contactors 21 being actuated by the emergency off switch 20.2 and by the protective door switch 20.1. Therefore, both motors could be brought to a standstill as a result of opening the corresponding protective door or the emergency off switch.

Figure 3:
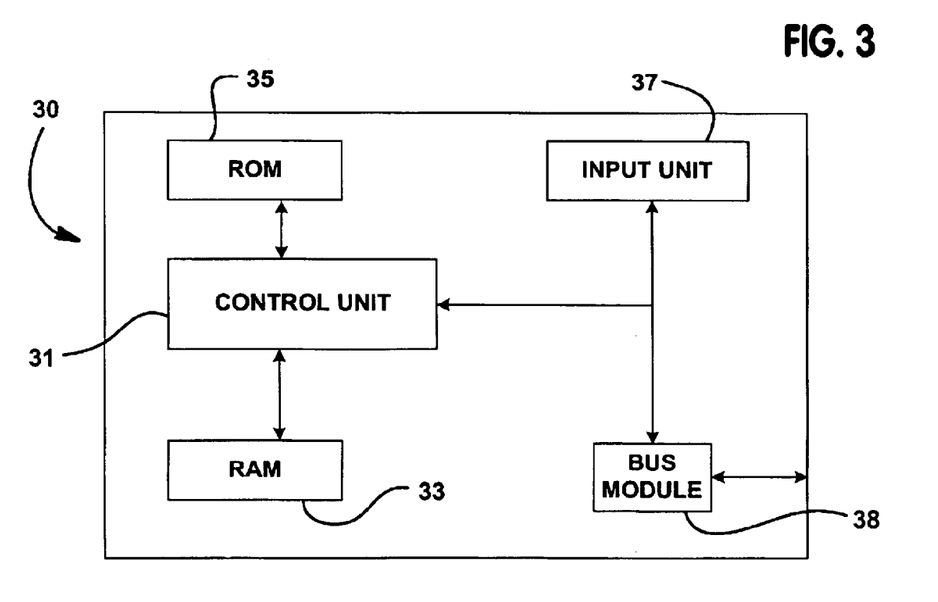
FIG. 3 shows a schematic block representation of a control device which is provided in a control module.

In FIG. 3, the control device 30 of the control module 16 is represented as a block diagram for the purpose of explanation. The control device 30 comprises a control unit 31 which, for example, is implemented as a microprocessor. Connected to the control unit 31 via appropriate lines are a random access memory (RAM) 33 and a read only memory 35 (ROM, EEPROM, etc.). Furthermore, the control device 30 comprises an input unit 77, which permits data which is stored in the RAM memory 33 to be input and changed. In order to control the communication via a data and signal bus, not illustrated hier, a bus module 38 is provided. In the simplest case, the bus is implemented as a shift register, in which each module is one cell in the shift register, whose content is shifted to the control unit or the bus module 38 by clock signals.

As previously mentioned, the control device 30 contains a relative association table. The latter is stored in the ROM memory 35, so that it is not lost even in the event of power failure. In contrast to this, the absolute association table calculated by the control unit 31 is stored in the RAM memory 33. In addition, the control unit 31 controls the module detection operation, in which each module place 12.2 to 12.7 is interrogated in sequence to see whether a module has been plugged in and of what type (input or output module, type of module, for example which type of safety transmitter is connected, etc.) this module is.

Figure 4:
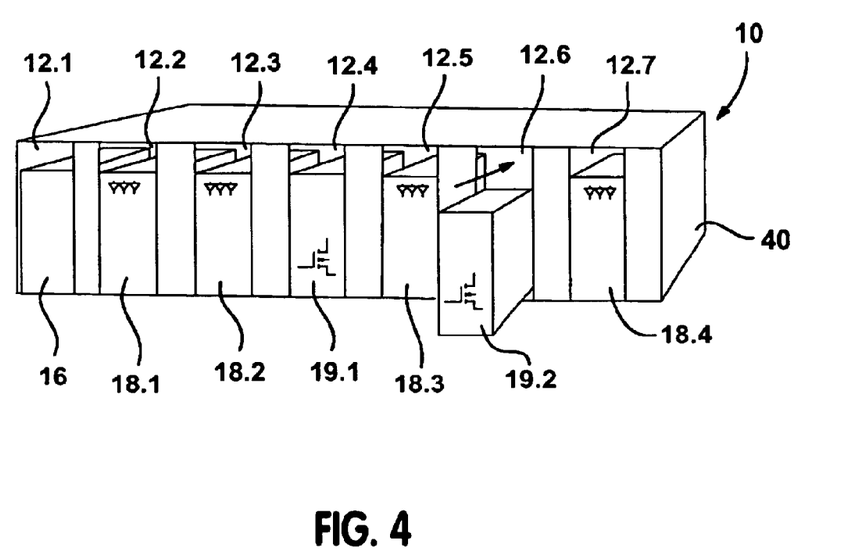
FIG. 4 shows a schematic perspective illustration of a safety switching device module arrangement corresponding to the structure shown in FIG. 1.

The module arrangement 10 is illustrated in a perspective view in FIG. 4. This module arrangement 10 comprises a housing 40, illustrated schematically, in which individual module places 12.1 to 12.7 are provided physically. The population of the module places 12.1 to 12.7 corresponds to the population shown in FIG. 1 and described extensively there, so that a repeated description will be dispensed with.

The individual modules 18, 19 can be pushed into the respective module place 12 from the front in a simple way, as illustrated graphically in the case of the output module 19.2. On the rear of the modules 18, 19, plug-in contacts are preferably provided, which engage in corresponding plug-in contact receptacles. These plug-in contact receptacles are provided on a circuit board 50 which extends over the entire width on the rear of the housing 40. This circuit board 50 can be seen in the rear view illustrated in FIG. 5. Furthermore, the plug-in contact receptacles at each module place 12 are indicated schematically and identified by reference numeral 52. On the circuit board 50 there run the lines required to supply the individual modules, and in particular the data and signal bus, a few lines being illustrated for the purpose of illustration and are designated by reference numeral 53.

FIG. 4 reveals that the module arrangement 10 according to this embodiment permits a hierarchical switching device system to be built up in a simple way. In particular, the system can be rebuilt very simply as required and therefore adapted to new conditions. Furthermore, the aforementioned relative association table opens up a very simple possibility of associating different input modules to different output modules in different ways. In this case, it is no longer necessary to change the wiring of the input and output modules.

An alternative accommodation of modules which is more flexible as compared with the housing shown in FIG. 4 is to provide a top-hat rail, as it is known per se, within a switch cabinet, to which rail the modules can be fitted as desired. Therefore, no permanently predefined module places exist any more, which does not permit the interconnection of the individual modules by means of permanent wiring, for example by means of the circuit board shown in FIG. 5. Rather, the modules are connected to one another via a serial synchronous bus system, a module in each case being connected to the adjacent modules via appropriate signal lines. In this case, the association of the input modules to the output modules is carried out via the relative association table which has already been mentioned and which is stored in the control module 16. Via the data bus, the control module 16 is able to detect the module places or the module positions of the input modules and of the output modules within the series of modules and—as previously explained—to calculate the absolute association table.

Consequently, it is not essential whether the input modules or the output modules are fit in defined module places or, for example, in any desired manner to a top-hat rail within a switch cabinet.

Figure 6:
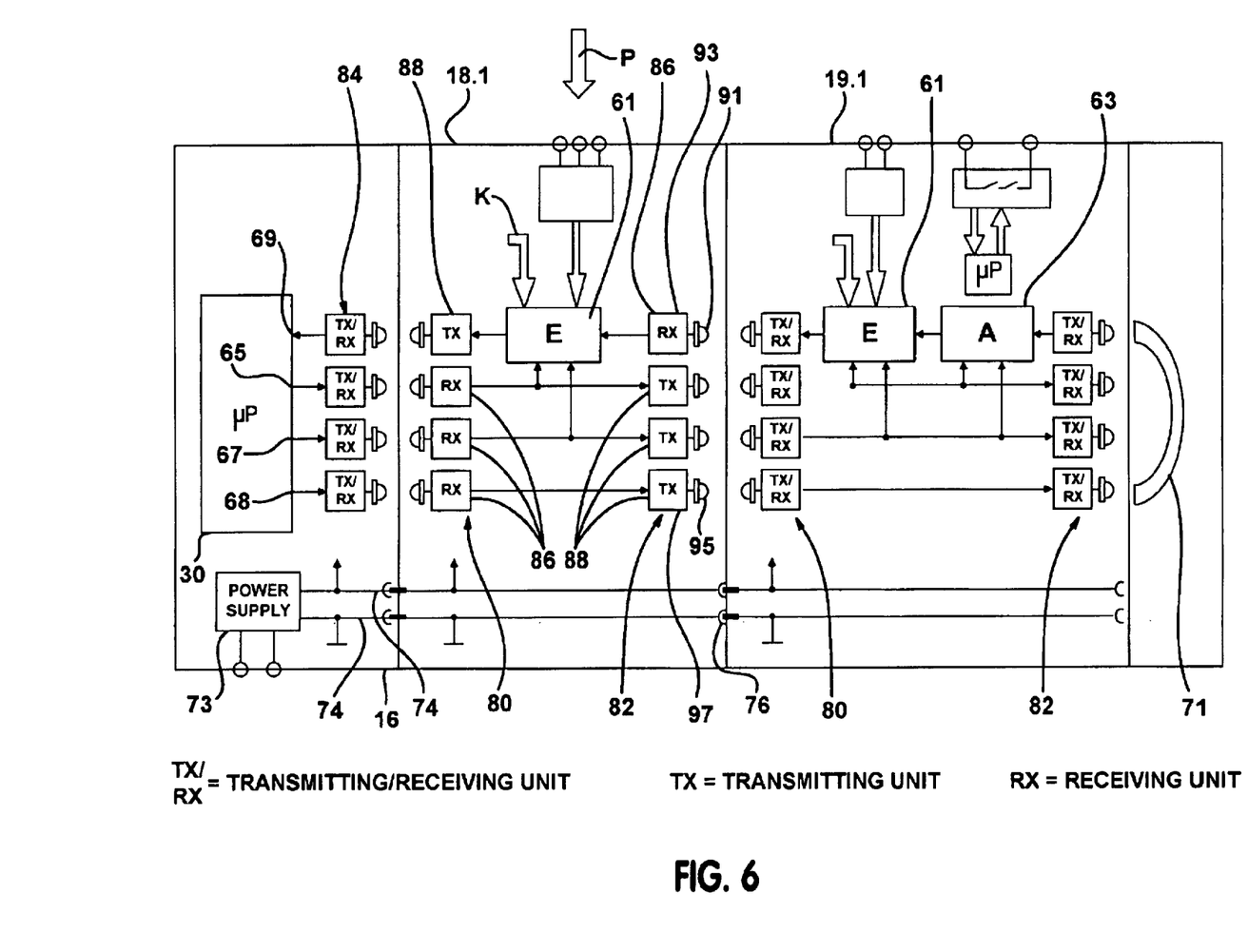
FIG. 6 shows a schematic block representation of a safety switching device module arrangement corresponding to a further embodiment.

FIG. 6 shows a section of a module arrangement 10' which, in terms of its functionality, does not differ from the module arrangement 10 already explained. The difference between this module arrangement 10' and the module 10 already explained consists in the type of data and signal transmission from one module to the other.

In contrast to the wire-bound bus solution described above, the data is transmitted here on an optical path in the module arrangement 10' according to FIG. 6. For this purpose, the input modules 18 and the output modules 19 each have two transmitting/receiving units 80, 82. The control module 16, on the other hand, comprises only one transmitting/receiving unit 84.

The two transmitting/receiving units 80 comprise three receiving elements 86 and a transmitting element 88. In contrast to this, the transmitting/receiving units 82 and 84 comprise three transmitting elements 88 and one receiving element 86.

Each of the receiving elements 86 comprises an infrared sensor 91 and an amplifier stage 93, which amplifies the output signal from the infrared sensor 91.

Each transmitting element 88 comprises an infrared transmitter, preferably in the form of an infrared LED 95, and a driver stage 97 serving to drive the LED 95.

In the present exemplary embodiment, the transmitting/receiving units 80 are arranged on the left within the input or output modules, while the transmitting/receiving units 82 are arranged on the right in the modules. The same applies to the transmitting/receiving unit 84 in the control module 16. In order to permit transmission of data from one module to the adjacent module, openings for the infrared transmitters and infrared receivers are provided in the side walls of the modules. If the modules in a series of modules are arranged side wall to side wall, a transmitting/receiving unit 80 of a module is opposite a transmitting/receiving unit 82 or 84 of the adjacent module, so that an optical connection is established between the infrared receivers and the infrared transmitters. In this way, a bus system within the series of modules can be built up via an appropriate module-internal connection between the transmitting/receiving unit 80 and the transmitting/receiving unit 82.

For the purpose of data transmission via the optical data bus from and to the control device 30, it is necessary for each module 18 and 19 to have appropriate registers for storing data. In the present exemplary embodiment, the input module 18.1 comprises an input shift register 61, which stores a signal from the connected safety transmitter 20.

The output module 19 likewise comprises an input shift register 61 and an output shift register 63, in which a signal provided to control the contactor 21 is stored.

The individual shift registers 61, 63 of the input and output modules arranged in the series of modules form a shift register, which is controlled by the control device 30. Via an output 65, the control device 30 can transmit a clock signal to the modules 18, 19, which ensures that an item of data stored in a shift register 61, 63 is shifted to the next shift register in the direction of the control device 30. Via an output 67 of the control device 30, a transfer signal can be transmitted to the modules 18, 19, which ensures that a signal present on the respective shift register is stored.

Furthermore, the control device 30 comprises a data output 68, via which data is transmitted to the modules 18, 19, and a data input 69, to which data in the shift registers is supplied. The present bus system thus comprises two control lines, which are connected to the outputs 65 and 67 of the control device 30, and two data lines, which are connected to the output 68 and the input 69, respectively. In order to permit a connection between the two data lines at the end of the series of modules, a coupling element 71 in the form of an optical conductor is fitted in the present case.

The power supply to the individual modules 18, 19 is provided via a power supply unit 73 which is provided in the control module 16 and from which two supply lines 74 originate. Each of the modules 16, 18, 19 has corresponding plug-in contacts 76, in order to lead the supply lines 74 through all the modules and therefore to ensure the appropriate supply.

As already described in connection with the first exemplary embodiments, each module 18, 19 has a code which is supplied to the control module. The respective code is achieved in a module 18, 19 by hardware, for example by means of a resistor circuit. In FIG. 6, the arrows K are intended to indicate that the respective code information is supplied to both input shift registers 61 and is forwarded to the control module via the bus.

It goes without saying that the exemplary embodiments shown in FIGS. 1 and 6 have a purely explanatory character and do not restrict the scope of the invention. Rather, other embodiments are entirely conceivable. For example, it is possible to dispense with the control module 16 and to implement the linking table in the form of permanent wiring of the individual module places 12. It is clear that this solution has restricted flexibility as compared with the exemplary embodiment described previously. Nevertheless, it is sufficient for many applications.

Figure 5:
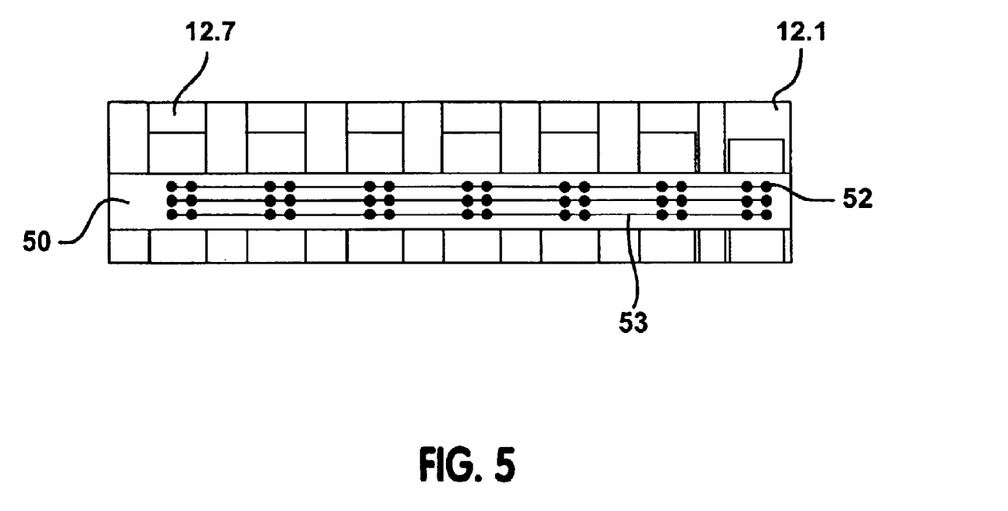
FIG. 5 shows a schematic representation of the rear of the safety switching device module arrangement depicted in FIG. 4.

In addition, the circuit board 50 shown in FIG. 5 for the electrical connection between the individual modules may be implemented in another way, which is familiar to the average person skilled in the art.

What is claimed is:

1. A safety switching device module arrangement for driving at least one actuator in response to a safety switching event represented by a safety transmitter, said module arrangement comprising:
   a plurality of input module places each adapted to accommodate an input module,
   a plurality of output module places each adapted to accommodate an output module,
   at least one input module adapted to process an input signal received from said safety transmitter, said at least one input module generating at least one output signal in correspondence to said safety switching event, and
   a plurality of output modules, each of said output modules being adapted for receiving said output signal and being configured for driving an actuator in response to said output signal,
   wherein said input module places and said output modules places are physically arranged in a series forming a series of module places such that said at least one input module and said output modules each have a defined position within said series, and
   wherein said input module places and said output module places are configured so that the associated signal connectivity between said input module and said output modules is determined by the position of said input module within said series of module places.

2. The module arrangement of claim 1, comprising at least a first, a second, and a third input module place each adapted for accommodating an input module, and at least a first and a second output module place each adapted for accommodating an output module, wherein the first input module place is connected to the first output module place, wherein the second input module place is connected to the second output module place, and wherein the third input module place is connected to both the first and the second output module place.

3. The module arrangement of claim 2, wherein each input module place has an output terminal, and each output module place has an input terminal, and wherein each output terminal is fixedly wired to at least one of said input terminals.

4. A safety switching device module arrangement for driving at least one actuator in response to a safety switching event, said module arrangement comprising;
   a plurality of input modules each for processing an input signal received from a safety transmitter, said input modules each generating an output signal in correspondence to said safety switching event, and
   at least a first and a second output module, each of said output modules being adapted for receiving said output signals and being configured to drive an actuator in response to said output signals,
   wherein said input modules and said output modules are physically arranged in a series forming a physically arranged series of modules, each of said modules having a defined position within said physically arranged series, and
   wherein each of said input modules is connected to at least one of said output modules depending on its position within said physically arranged series of modules.

5. The module arrangement of claim 4, further comprising module places each for accommodating either one input module or one output module.

6. The module arrangement of claim 4, further comprising a control module for controlling said connections of said input modules to said output modules.

7. The module arrangement of claim 6, wherein said control module comprises a memory unit, in which an association table defining said connections is stored, and further comprising a data bus connecting said control device to said input and said output modules.

8. A safety switching device module arrangement for driving at least one actuator in response to a safety switching event represented by a safety transmitter, said module arrangement comprising:

at least one input module for processing an input signal received from said safety transmitter, said at least one input module generating at least one output signal in correspondence with said safety switching event, and a plurality of output modules, each of said output modules being adapted for receiving said output signal and being configured for driving an actuator in response to said output signal, wherein said input module and said output modules are physically arranged in a series forming a physically arranged series of modules, each of said modules having a defined position within said physically arranged series, and wherein said input module has an associated signal connectivity to at least one of said output modules based on its position within said physically arranged series of modules.

9. The module arrangement of claim 8, comprising at least a first, a second, and a third input module place each for accommodating an input module, and at least a first and a second output module place each for accommodating an output module, wherein the first input module place is associated to the first output module place, wherein the second input module place is associated to the second output module place, and wherein the third input module place is associated to both the first and the second output module place.

10. The module arrangement of claim 9, wherein each input module place has an output terminal, and each output module place has an input terminal, and wherein each output terminal is wired to at least one of said input terminals in accordance with said associations.

11. The module arrangement of claim 8, further comprising a control module which controls said associations of said input modules to said output modules.

12. The module arrangement of claim 11, wherein said control module comprises a control device having a memory unit, in which an association table representing said associations is stored.

13. The module arrangement of claim 12, wherein said control module comprises a microprocessor as control device and a data bus for connecting the control device to said modules.

14. The module arrangement of claim 13, wherein said data bus is implemented as an optical data bus, and wherein each input module and each output module comprises an optical transmitter and an optical receiver for establishing an optical data connection between modules adjacent within said series of modules.

15. The module arrangement of claim 12, wherein said control device comprises a detection unit for detecting a positioning of said input and output modules within said series of modules, said detection unit being adapted to determine an absolute association table on the basis of the positioning of the output modules detected and on the basis of a predefined relative association table.

16. The module arrangement of claim 12, further comprising an input unit for editing said association table.

17. The module arrangement of claim 8, wherein said at least one input module is an input circuit and each of said plurality of output modules is an output circuit of a safety switching device.

* * * * *